United States Patent [19]

Hardwick

[11] 3,929,131

[45] Dec. 30, 1975

[54] BANDAGE AND METHOD OF USING SAME

[76] Inventor: Thomas L. Hardwick, 2512 W. Vivion Road, North Kansas City, Mo. 64151

[22] Filed: Jan. 9, 1975

[21] Appl. No.: 539,732

[52] U.S. Cl. ............. 128/254; 128/82.1; 128/403
[51] Int. Cl.² ............................. A61F 7/00
[58] Field of Search ......... 128/254, 82.1, 399, 402, 128/403, 275.1, 156

[56] References Cited
UNITED STATES PATENTS

| 2,208,855 | 7/1940 | Riley | 128/399 X |
|---|---|---|---|
| 2,858,830 | 11/1958 | Robins | 128/156 |
| 3,506,013 | 4/1970 | Zdenek | 128/402 |
| 3,871,376 | 3/1975 | Kozak | 128/275.1 |

*Primary Examiner*—Lawrence W. Trapp
*Attorney, Agent, or Firm*—Robert G. McMorrow

[57] ABSTRACT

Superficial wounds in the skin are treated by the application thereto of a bandage in frozen condition. The bandage is provided with a heat transfer means, and may have medication or refrigerant incorporated therein. The medication is released upon thawing.

5 Claims, 6 Drawing Figures

BANDAGE AND METHOD OF USING SAME

BACKGROUND OF THE INVENTION

1. Field of the Invention

This invention pertains to the treatment of cuts and other small wounds of the type to which a packaged adhesive bandage is normally applied. The invention pertains to the bandage per se and to the manner of its use.

2. Statement of the Prior Art

The desirability of application of a cold substance to a wound for the purpose of promoting rapid coagulation of blood and to accelerate healing has been previously proposed. Bandages of pre-packaged variety including adhesive securing means are also known. Prior patents in this field include the following:

| Patent No. | Patentee | Issue Date |
|---|---|---|
| 2,390,184 | Seng | Dec. 4, 1945 |
| 3,113,568 | Robins | Dec. 10, 1963 |
| 3,596,657 | Eidus | Aug. 3, 1971 |

SUMMARY OF THE INVENTION

This invention contemplates the application of a bandage in frozen condition to a wound. It is the principal objective of the invention to provide novel means for promotion of the rapid coagulation of blood from a wound, and the avoidance of infection of the wound area through the application thereto of a frozen substance. In one form of the invention, prepared medication is incorporated in the bandage assembly for release to the wound area during thawing of the bandage.

In another form of the invention, a refrigerant substance is incorporated in globule form within a sponge. Such substance is activated through pressure applied to the sponge to provide a freezing action therein.

The invention thus combines the desirable characteristics of application of low temperature, and slow release of medication to the wound area.

Other and further objects and advantages of the invention will become apparent to those skilled in the art from a cnsideration of the following specification when read in conjunction with the annexed drawing.

DESCRIPTION OF THE PREFERRED EMBODIMENTS

Figure 1:
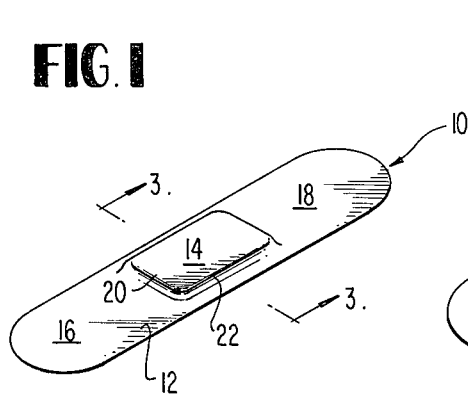
FIG. 1 is a perspective view showing a first form of bandage assembly constructed and assembled in accordance with the teachings of this invention.
Figure 2:
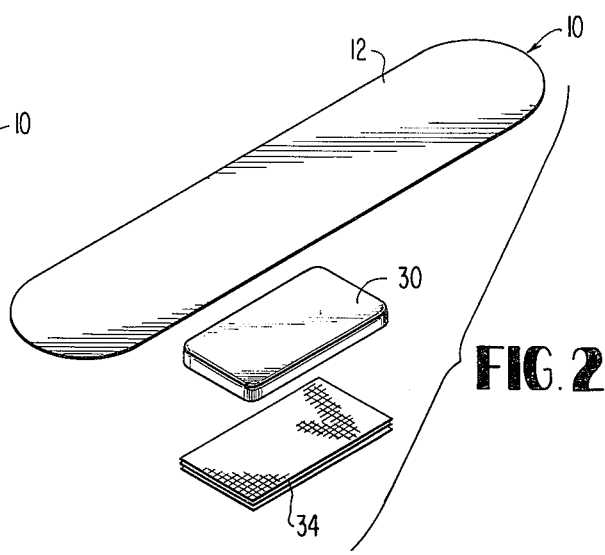
FIG. 2 is an enlarged, disassembled perspective view of the assembly of FIG. 1.
Figure 3:
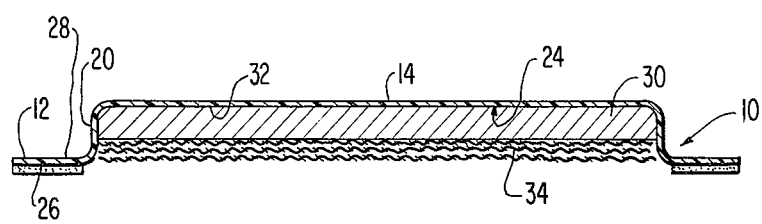
FIG. 3 is a further enlarged sectional view taken on line 3—3 of FIG. 1, looking in the direction of the arrows.

Referring to the drawing in more detail, and initially to FIGS. 1 through 3, inclusive, a first form of bandage assembly 10 employed in the practice of this invention is therein shown. The assembly 10 includes an elongated main body strip 12 formed of flexible plastic, fabric, or the like, and having a central panel 14 and opposite side panels 16 and 18. The central panel has a raised or indented section which is elevated from the general flatwise extent of the strip at its end 20 and sides 22 to form a chamber 24.

The side panels 16 and 18 serve as attachment means for the strip, and have opposite inner and outer surfaces 26, 28. The inner surfaces 26 have a suitable adhesive (preferably one not affected as to operation by reduced temperatures) applied thereto, such adhesive being protected prior to use of the bandage by a covering of non-adhered material (not shown).

A pad 30 of substantially rectangular form is engaged in the chamber 24 against the inside surface 32 of the central panel. A gauze panel 34 of multi-layer form overlies the pad 30 and serves a dual function. The panel 34 is sterile and therefore aids in wound healing, and it also provides a means to retain the pad 30 in place.

The pad 30 may take numerous forms. It is, in one of such forms, fabricated of a material adapted to absorption of heat at a reduced rate relative to the other materials of the bandage whereby it functions as a heat sink. Alternately, it it may store, in frozen condition, various medications, antiseptics, or the like, for release through the gauze panel to the wound.

Figure 4:
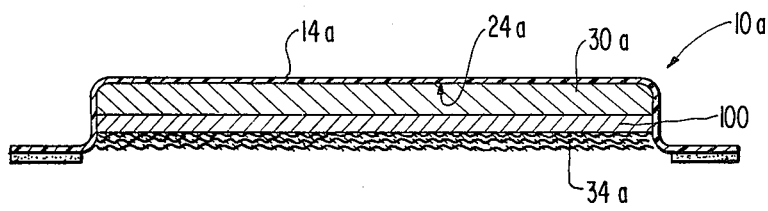
FIG. 4 is a view similar to FIG. 3 but showing a modification.

In FIG. 4, a combination of the foregoing is shown. Here, a bandage assembly 10a has a chamber 24a in its central or medicament panel 14a. An energy sink pad 30a is engaged against the inside surface. Immediately below the pad 30a is a quantity 100 of medication shown here in frozen block condition, but gradually liquified upon exposure to normal ambient temperatures above the freezing level of the liquid. This is covered by a panel 34a of gauze and the medication is released through this gauze to the wound when in use.

In a preferred method of use, the assembly 10 or 10a are stored in a refrigerated container until needed. While special containers may be provided, it is contemplated that the bandages might be vended through frozen food channels, and stored in home freezers or the freezing compartments of refrigeration equipment. Ideal temperature range for storage is approximately 0°F. When a wound occurs, the bandage is removed from the storage area and placed thereon with the central or medicament panel contacting the wound and the side panels adhesively secured to the skin about the wound. This applies the cold heat sink portion to the wound area, aiding in coagulation of blood, decreasing the possibility of infection, and otherwise supplying the benefits of reduced temperatures to the wound. As temperature exchange occurs, medication 100, or other medication in the bandage, is released gradually to the wound area.

Figure 5:
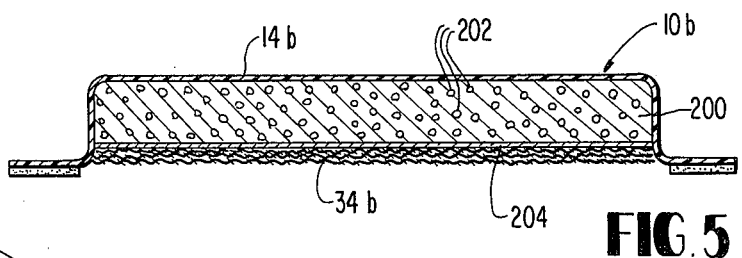
FIG. 5 is another sectional view showing a second embodiment of the invention.
Figure 6:
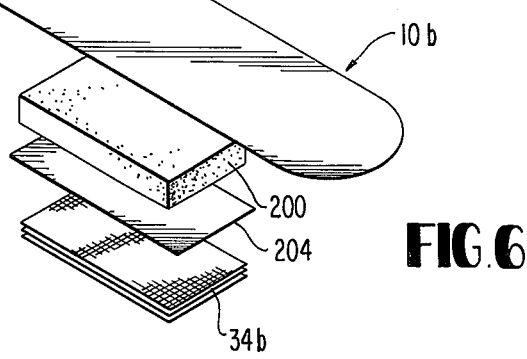
FIG. 6 is a disassembled perspective view on reduced scale of the form of the invention shown in FIG. 5.

FIGS. 5 and 6 show still another form of the invention. Here, the assembly 10b has a sponge 200 engaged in the central or medicament panel 14b. The sponge 200 is impregnated with a plurality of globules 202 of a refrigerant substance or other highly volatile material. The sponge is maintained in a chamber 24b of the panel, said chamber being closed by a shield in the form of a layer 204 of aluminum foil or other material impervious to the release of the refrigerant. A gauze panel 34b, which may or may not be medicated, extends below the shield. Operation here involves the application of pressure to the central panel to activate the refrigerant, thus freezing the central portion of the bandage temporarily.

I claim:
1. A bandage comprising:
an elongated main body strip having a central panel and side panels;
the side panels each having opposite inner and outer surfaces;
adhesive on said inner surfaces;
the central panel having inside and outside surfaces;
pad means engaged against the inside surface of the central panel, the pad means comprising a block of material having the characteristic of heat exchange at a slow rate;
means retaining the pad means against said inside surface of the central panel, the means for retaining the pad means comprising a gauze panel overlying the pad means;
at least the central panel being maintained at a temperature of less than 32°F prior to application to a wound; and
a block of medication adapted to be frozen and to be released in liquid form upon thawing interposed between the pad means and the gauze panel.

2. The invention of claim 1, wherein:
the pad means comprises a substantially rectangular sponge impregnated with a refrigerant substance in globule form, said refrigerant being activated by pressure applied to the sponge;
a cover shield member formed of metallic foil overlying said gauze; and
the means for retaining the pad means comprising a gauze panel overlying the cover member.

3. A method of treatment of wounds in the skin comprising the steps of:
maintaining a bandage having a medicament panel and adhesive attachment panels in frozen condition;
applying the bandage in frozen condition to the wound with the medicament panel in contact with the wound and with the attachment panels adhesively engaging the skin about the wound.

4. The invention of claim 3, and
the bandage having a quantity of medication in frozen condition incorporated in said medicament panel; and
the medication being gradually released upon thawing to treat the wound.

5. The invention of claim 3, and
the bandage having a sponge incorporated in said medicament panel, the sponge being impregnated with a refrigerant substance, said sponge being isolated from the wound by a shield impervious to said substance; and
the sponge substance being activated by the application of pressure to the sponge.

* * * * *